United States Patent
Chen

(10) Patent No.: US 8,472,716 B2
(45) Date of Patent: Jun. 25, 2013

(54) BLOCK-BASED NOISE DETECTION AND REDUCTION METHOD WITH PIXEL LEVEL CLASSIFICATION GRANULARITY

(75) Inventor: Yu-Ling Chen, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 1018 days.

(21) Appl. No.: 12/327,150

(22) Filed: Dec. 3, 2008

(65) Prior Publication Data

US 2009/0148003 A1 Jun. 11, 2009

(30) Foreign Application Priority Data

Dec. 5, 2007 (AU) ................................ 2007237365
Dec. 18, 2007 (AU) ................................ 2007249099

(51) Int. Cl.
*G06K 9/00* (2006.01)
(52) U.S. Cl.
USPC ........................................................ 382/173
(58) Field of Classification Search
None
See application file for complete search history.

(56) References Cited

U.S. PATENT DOCUMENTS

| | | | |
|---|---|---|---|
| 6,766,056 B1 | 7/2004 | Huang et al. | 382/190 |
| 6,782,129 B1 | 8/2004 | Li et al. | 382/176 |
| 6,839,151 B1 | 1/2005 | Andree et al. | 358/2.1 |
| 6,983,076 B2 | 1/2006 | Curry et al. | 382/260 |
| 2004/0016987 A1 | 1/2004 | Sawada et al. | 257/510 |
| 2008/0123945 A1* | 5/2008 | Andrew et al. | 382/164 |

FOREIGN PATENT DOCUMENTS

WO   WO 2006066325 A1 * 6/2006

* cited by examiner

*Primary Examiner* — Claire X Wang
*Assistant Examiner* — Thomas A James
(74) *Attorney, Agent, or Firm* — Fitzpatrick, Cella, Harper & Scinto

(57) ABSTRACT

A method detects noise in a document image. The image includes pixels representing at least text and image data forming the document. The noise includes at least one of halftone, bleeding and texture noise. The method partitions the image into tiles, formed of pixels, determines a set of dominant colors for each tile, associates each pixel with one of the determined dominant colors, and then determines for each dominant color a fragmentation statistic, and applies a threshold to each statistic to detect the noise in the corresponding dominant color in the tile. Detected noise in the image is reduced by (a) merging colors with noise to one color without noise if the noise is halftone noise or texture noise; and (b) removing the colors with noise if the noise is bleeding noise. The pixels of the tile are then quantized to those remaining dominant colors of the set.

15 Claims, 17 Drawing Sheets

Fig. 9

| 1 | 1 | 1 | 1 | 1 | 1 | 1 | 1 |
|---|---|---|---|---|---|---|---|
| 1 | 2 | 1 | 0 | 0 | 3 | 1 | 1 |
| 1 | 1 | 1 | 1 | 0 | 3 | 1 | 1 |
| 1 | 1 | 2 | 1 | 0 | 0 | 3 | 1 |
| 1 | 1 | 1 | 1 | 0 | 0 | 3 | 1 |
| 1 | 2 | 1 | 1 | 0 | 0 | 3 | 1 |
| 1 | 1 | 2 | 1 | 0 | 0 | 0 | 1 |
| 1 | 1 | 1 | 1 | 1 | 0 | 0 | 0 |

| 1 | 1 | 1 | 1 | 1 | 1 | 1 | 1 |
|---|---|---|---|---|---|---|---|
| 1 | 2 | 1 | 0 | 0 | 3 | 1 | 1 |
| 1 | 1 | 1 | 1 | 0 | 3 | 1 | 1 |
| 1 | 1 | 1 | 2 | 0 | 0 | 3 | 1 |
| 1 | 1 | 1 | 1 | 0 | 0 | 3 | 1 |
| 1 | 2 | 1 | 1 | 0 | 0 | 3 | 1 |
| 1 | 1 | 2 | 1 | 0 | 0 | 0 | 1 |
| 1 | 1 | 1 | 1 | 1 | 0 | 0 | 0 |

Quarter tile edge ratio for C0 =
5/1, 5/4, NA, 7/10
Quarter tile edge ratio for C1 =
12/13, 5/12, 12/14, 7/6
Quarter tile edge ratio for C2 =
7/2, NA, 9/2, NA
Quarter tile edge ratio for C3 =
NA, 9/3 NA, 5/2

Edge0_1 = 12   Edge1_2 = 15
Edge0_2 = 1    Edge1_3 = 7
Edge0_3 = 7    Edge2_3 = 0

Whole tile edge ratio for C0 = (Edge0_1+Edge0_2+Edge0_3)/15 = 20/15
Whole tile edge ratio for C1 = (Edge0_1+Edge1_2+Edge1_3) = 34/45
Whole tile edge ratio for C2 = (Edge0_2+Edge1_2+Edge2_3) = 16/4
Whole tile edge ratio for C3 = (Edge0_3+Edge1_3+Edge2_3) = 14/5

Fig. 11

| 1 | 1 | 1 | 1 | 1 | 1 | 1 | 1 |
|---|---|---|---|---|---|---|---|
| 1 | 1 | 1 | 0 | 0 | 3 | 1 | 1 |
| 1 | 1 | 1 | 1 | 0 | 3 | 1 | 1 |
| 1 | 1 | 1 | 1 | 0 | 0 | 3 | 1 |
| 1 | 1 | 1 | 1 | 0 | 0 | 3 | 1 |
| 1 | 1 | 1 | 1 | 0 | 0 | 3 | 1 |
| 1 | 1 | 1 | 1 | 0 | 0 | 0 | 1 |
| 1 | 1 | 1 | 1 | 1 | 0 | 0 | 0 |

Edge0_1 = 13    Edge1_2 = 0
Edge0_2 = 0     Edge1_3 = 7
Edge0_3 = 7     Edge2_3 = 0

Whole tile edge ratio for C0 = (Edge0_1+Edge0_2+Edge0_3)/15 = 20/15
Whole tile edge ratio for C1 = (Edge0_1+Edge1_2+Edge1_3) = 20/49
Whole tile edge ratio for C2 = NA
Whole tile edge ratio for C3 = (Edge0_3+Edge1_3+Edge2_3) = 14/5

Fig. 14

BLOCK-BASED NOISE DETECTION AND REDUCTION METHOD WITH PIXEL LEVEL CLASSIFICATION GRANULARITY

CROSS-REFERENCE TO RELATED PATENT APPLICATIONS

This application claims the right of priority under 35 U.S.C. §119 based on Australian Patent Application No. 2007237365, filed 5 Dec. 2007, and Australian Application No. 2007249099, filed 18 Dec. 2007, both of which are incorporated by reference herein in their entirety as if fully set forth herein.

TECHNICAL FIELD

The current invention relates to the detection, and desirably the removal, of artifacts, such as halftone, bleeding and texture noise, in a scanned compound document image for document image analysis.

BACKGROUND ART

The proliferation of scanning technology combined with ever increasing computational processing power has lead to many advances in the area of document analysis and systems for such analysis. These systems may be used to extract semantic information from a scanned document, often by means of optical character recognition (OCR) technology. This technology is used in a growing number of applications such as automated form reading. The technology can also be used to improve compression of a document by selectively using an appropriate compression method depending on the content of each part of the page (e.g., bitmap image, graphical object image, text, etc.). Improved document compression lends itself to applications such as archiving and electronic distribution.

Document analysis can typically be broken into three stages. The first of these stages involves pixel color analysis. The second stage is document layout analysis, which identifies content types such as text, backgrounds and images in different regions of the page. The final stage uses the results of the first two stages and some further analysis to create a final output. The desired final output depends on the application. Some typical applications include document compression, OCR, and vectorization.

Pixel color analysis involves segmenting the scanned images into perceptually uniform color regions. The most common format is a binary image which can be obtained by various adaptive thresholding methods. Binary format is simple and effective for simple document images because generally documents have dark text on light background or light text on dark background. However as color printing becomes more advanced and widely used, and thus the choices of colors on documents also get more diverse, binary representation becomes ineffective. Some combinations of colors cannot be thresholded because they have similar luminance values. Common examples are yellow or green text on white background. Color pixel segmentation can be used to solve this problem. There are two common methods of color pixel segmentation. The first method is grouping similarly colored pixels together by giving them the same label. The second method is color quantization. Some applications also use the combination of the two methods. FIG. 17(a) and FIG. 18(a) are two examples 1900 and 2000 of typical scanned images for document analysis. The images 1900 and 2000 each include text and a background representing text data and image data used to form a compound document. FIG. 17(b) and FIG. 18(b) are corresponding binarized images derived from FIG. 17(a) and FIG. 18(a). FIG. 17(c) and FIG. 18(c) are the typical output of color pixel segmentation from the same input.

All the pixel segmentation methods mentioned above suffer from noise because a huge degradation on the scanned images has occurred from the original raster image processed (RIP'ed) images through the original printing and subsequent scanning processes. Artifacts such as noise in scanned documents affects the accuracy of image type classification for document analysis applications. The types of noise include halftone, registration error, bleeding and JPEG artifacts. Halftone noise is generally the most critical type. Most document analysis applications either employ a pre-processing stage to remove halftone noise or to embed halftone detection in image type classification with a geometrically coarse classification. Other noise is normally removed by removing small blobs or regions of labelled pixels or recursively merging small blobs. The noise removal process is time consuming and implementation costly.

In document copy applications (scan then print), the detection and removal operations of halftone noise are often done at the same time by a moving window with the centre pixel being the target. The process produces a set of pixels for the centre pixel using different filters in parallel. The classification state of the centre pixel decides which of the manipulated pixels should be output for the centre pixel. The size of the window normally is quite small. While this implementation is very efficient in hardware, it suffers inaccuracy in detection due to the lack of context information. Better context information can be achieved if the window is bigger. However the hardware implementation cost increases significantly when the window size increases. A software implementation for this method is not desirable because filter operations are very slow in software.

In document analysis applications such as OCR, image region segmentation and automatic form processing etc., the halftone detection process is often embedded into image region classification. Inage region classification schemes can range from a simple classification such as halftone/non-halftone to a more complicated classification such as flat/contone/rough halftone/smooth halftone/graphics. The classification normally works in larger non-overlapped blocks. A block of pixels is analysed and a set of features are extracted. The block is then classified into a predefined type based on the extracted features. For a block classified as halftone, a blurring function is normally applied to the whole block to remove halftone. This method is faster than the moving window style in software implementations and the accuracy generally is also higher because the block normally provides better context information. However this method suffers from geometrically coarse classification because each block can only have one classification type in contrast to each pixel having a classification type in the moving window style.

Geometrically coarse halftone classification affects text visual quality especially in the case of text over halftone. Without halftone removal, the background halftone noise can be incorrectly selected as foreground text and subsequently affects further text processing such as OCR. On the other hand, if a text over halftone block is halftone removed by applying a blurring function to the block, the text in that block will appear blurry. Blurry text can cause broken or missing text strokes when the image is pixel segmented into perceptually uniform color regions. This will directly affect the OCR results.

There is a need for a pixel color analysis technique that segments scanned images with high accuracy thereby accommodating pixel level detail.

SUMMARY

The present disclosure provides pixel level noise type classification that may be performed during pixel color segmentation processing in a non-overlapped block raster order. Pixel level halftone classification enables crisp text pixel segmentation for text in halftone regions without blurring the text. Other types of noise are also detected in the same process. The detected noise is reduced by reducing the dominant colors and re-quantization. The pixel level noise type classification can also be used in the printing backend process to remove halftone noise or registration error on the scanned images and improve printing quality. These approaches effectively alleviate the problems in geometrically coarse classification with integrated noise reduction in the pixel segmentation process.

In accordance with one aspect of the present disclosure there is provided a method of detecting noise in an image of a compound document. The image comprising pixels representing at least text data and image data used to form the compound document. The noise comprises at least one of halftone, bleeding and texture noise. The method partitions the image into a plurality of tiles each formed of a plurality of pixels and determines a set of dominant colors for each said tile and associating each pixel with one of the determined dominant colors. The method then determines for each dominant color a fragmentation statistic; and applies a threshold to each said fragmentation statistic to detect the at least one of halftone, bleeding and texture noise in the corresponding dominant color in the tile.

The method may be extended to reduce detected noise in the image by processing the colors of each said tile by (a) merging each of the colors with noise to one said color without noise if the noise is halftone noise or texture noise and (b) removing the colors with noise if the noise is bleeding noise. Then the pixels of the tile are quantized to those remaining dominant colors of the set.

Other aspects are also disclosed.

BRIEF DESCRIPTION OF THE DRAWINGS

At least one embodiment of the present invention will now be described with reference to the drawings, in which:

FIG. 9 is an example of a quantized map;

FIG. 11 is an example of pixel quantization statistics;

FIG. 14 illustrates the updated edge ratios and border length counters of the example in FIG. 11;

DETAILED DESCRIPTION INCLUDING BEST MODE

Figure 19:
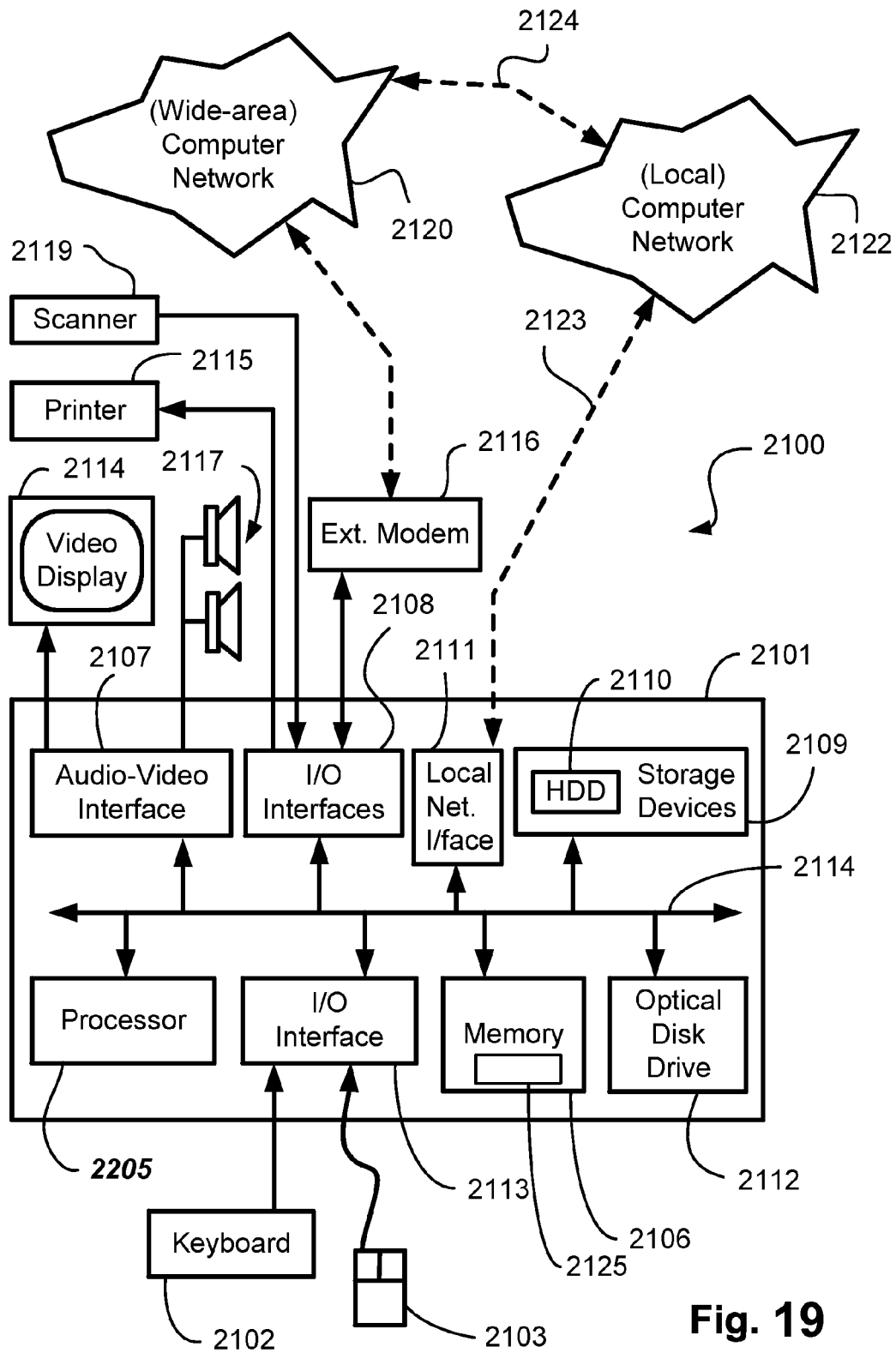
FIG. 19 is a schematic block diagram representation of general purpose computer system upon which the arrangements described may be performed.

The methods of detection and removal of noise and other artifacts in a scanned compound document may be implemented using a computer system 2100, such as that shown in FIG. 19 wherein the processes of FIGS. 1 to 16 may be implemented as software, such as one or more application programs 2125 executable within the computer system 2100. In particular, the steps of the methods of noise detection and removal are effected by instructions in the software that are carried out within the computer system 2100. The instructions may be formed as one or more code modules, each for performing one or more particular tasks. The software may also be divided into two separate parts, in which a first part and the corresponding code modules performs the noise detection and removal methods and a second part and the corresponding code modules manage a user interface between the first part and the user. The software 2125 may be stored in a computer readable medium, including the storage devices such as 2106 described below, for example. The software is loaded into the computer system 2100 from the computer readable medium, and then executed by the computer system 2100. A computer readable medium having such software or computer program recorded on it is a computer program product. The use of the computer program product in the computer system 2100 preferably effects an advantageous apparatus for noise detection and removal from scanned compound documents.

As seen in FIG. 19, the computer system 2100 is formed by a computer module 2101, input devices such as a keyboard 2102, a mouse pointer device 2103 and scanner 2119, and output devices including a printer 2115, a display device 2114 and loudspeakers 2117. An external Modulator-Demodulator (Modem) transceiver device 2116 may be used by the computer module 2101 for communicating to and from a communications network 2120 via a connection 2121. The network 2120 may be a wide-area network (WAN), such as the Internet or a private WAN. Where the connection 2121 is a telephone line, the modem 2116 may be a traditional "dial-up" modem. Alternatively, where the connection 2121 is a high capacity (e.g.: cable) connection, the modem 2116 may be a broadband modem. A wireless modem may also be used for wireless connection to the network 2120.

The computer module 2101 typically includes at least one processor unit 2105, and a memory unit 2106 for example formed from semiconductor random access memory (RAM) and read only memory (ROM). The module 2101 also includes an number of input/output (I/O) interfaces including an audio-video interface 2107 that couples to the video display 2114 and loudspeakers 2117, an I/O interface 2113 for the keyboard 2102 and mouse 2103 and optionally a joystick (not illustrated), and an interface 2108 for the external modem 2116, scanner 2119 and printer 2115. In some implementations, the modem 2116 may be incorporated within the computer module 2101, for example within the interface 2108. The computer module 2101 also has a local network interface 2111 which, via a connection 2123, permits coupling of the computer system 2100 to a local computer network 2122, known as a Local Area Network (LAN). As also illustrated, the local network 2122 may also couple to the wide network 2120 via a connection 2124, which would typically include a so-called "firewall" device or similar functionality. The interface 2111 may be formed by an Ethernet™ circuit card, a wireless Bluetooth™ or an IEEE 802.11 wireless arrangement.

The interfaces 2108 and 2113 may afford both serial and parallel connectivity, the former typically being implemented according to the Universal Serial Bus (USB) standards and having corresponding USB connectors (not illustrated). Storage devices 2109 are provided and typically include a hard disk drive (HDD) 2110. Other devices such as a floppy disk drive and a magnetic tape drive (not illustrated) may also be used. An optical disk drive 2112 is typically provided to act as a non-volatile source of data. Portable memory devices, such optical disks (e.g.: CD-ROM, DVD), USB-RAM, and floppy disks for example may then be used as appropriate sources of data to the system 2100.

The components 2105 to 2113 of the computer module 2101 typically communicate via an interconnected bus 2104 and in a manner which results in a conventional mode of operation of the computer system 2100 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 2110 and read and controlled in execution by the processor 2105. Intermediate storage of such programs and any data fetched from the networks 2120 and 2122 may be accomplished using the semiconductor memory 2106, possibly in concert with the hard disk drive 2110. In some instances, the application programs may be supplied to the user encoded on one or more CD-ROM and read via the corresponding drive 2112, or alternatively may be read by the user from the networks 2120 or 2122. Still further, the software can also be loaded into the computer system 2100 from other computer readable media. Computer readable media refers to any storage medium that participates in providing instructions and/or data to the computer system 2100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 2114. Through manipulation of the keyboard 2102 and the mouse 2103, a user of the computer system 2100 and the application may manipulate the interface to provide controlling commands and/or input to the applications associated with the GUI(s).

Documents may be using the computer 2101 to the printer 2115 and may be scanned using the scanner 2119. Scanned documents may be stored electronically in the store 2109. The printer 2115 and scanner 2119 may collectively form a photocopier or otherwise be parts of a multi-function device (MFD). Alternatively scanned documents may be accessed via the networks 2120 and/or 2122.

Figure 1:
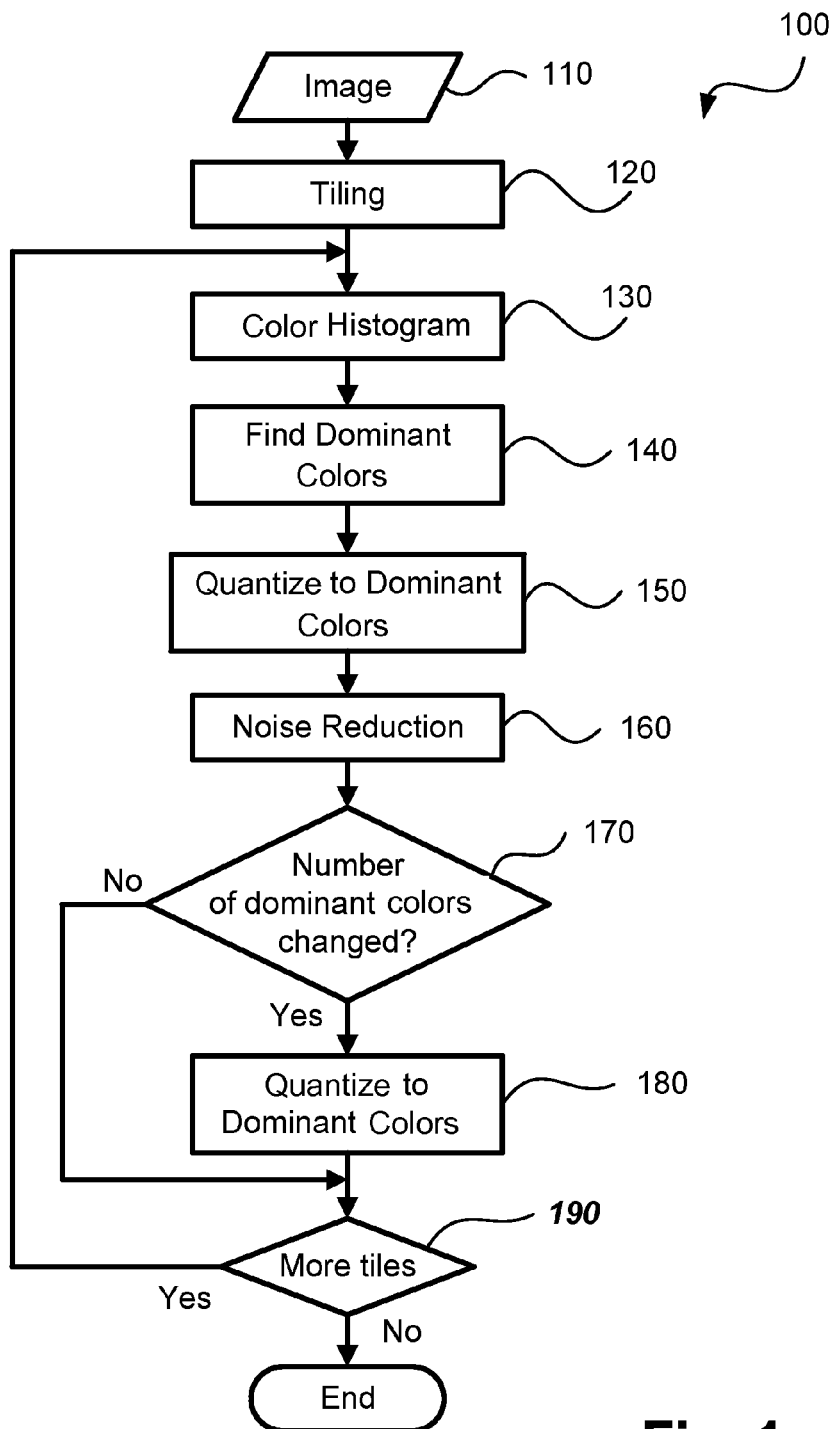
FIG. 1 is a flow chart for a method of detecting noise in a compound document image.

FIG. 1 shows a flowchart of a method 100 of detecting noise in a compound document image. The method 100 is preferably implemented as software executable within the computer system 2100 as discussed above. The method 100 receives, either by placing a document upon the scanner 2119 and scanning the document to the memory 2106, or by downloading the image from an external source (not shown) over the network 2120, an input image 110 which is partitioned in step 120 by the processor 2205 according to instructions in the software application 2125, into uniform sized tiles, each preferably of size 32×32 (1024) pixels when the input resolution is 300 dpi. Different tile sizes can also be used. A tile may also be termed a block of the image. The tiles are preferably processed in raster order—that is from left to right, and top to bottom. The tiling of step 120 may be performed on the entirety of the image, or upon a band of the image in raster order. The following steps 130-180 of the method 100 are then performed on each tile, again preferably in raster order.

Step 130 involves a Color Histogram process performed by the processor 2205 according to instructions in the software application 2125, which reduces a tile of continuous tone pixels into an indexed image, essentially counting the number of pixels in the tile that accord with specific colors. YCbCr is the preferred color space for the step 130, and also the entirety of the method 100, although other color spaces may be used at one or more stages. In a preferred implementation the indexed image is formed of a palette of less than 33 colors and an indexed map. The number of colors in a palette depends on the similarity of colors in the tile. The color value for each palette color depends on the color composition in the tile. For example a tile with text on plain background may only uses less than eight palette colors while a tile with halftoned image may require 32 palette colors. Since the number of colors in the palette is in this implementation limited to about 3% of the number of pixels in the tile, quantization of the pixel colors to the palette colors is required.

Figure 17:
FIGS. 17(a) to 17(d) represent one example of two different colored texts on white background.
Figure 17:
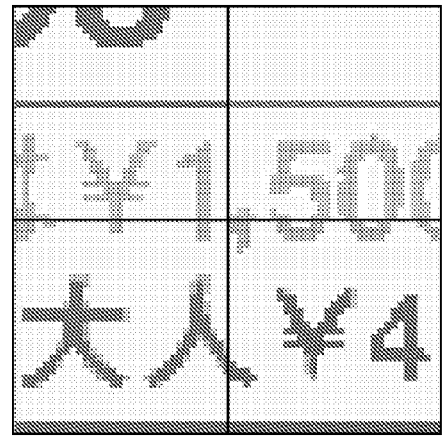
Figure 17:
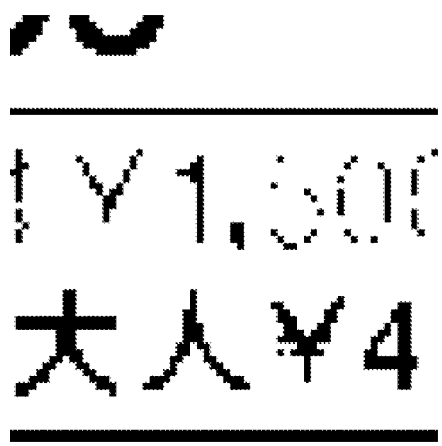
Figure 17:
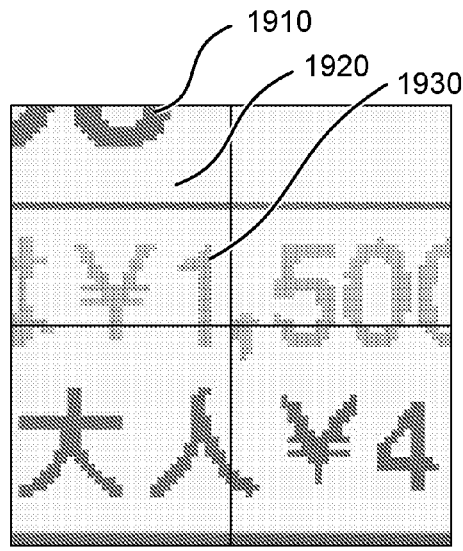
Figure 18A:
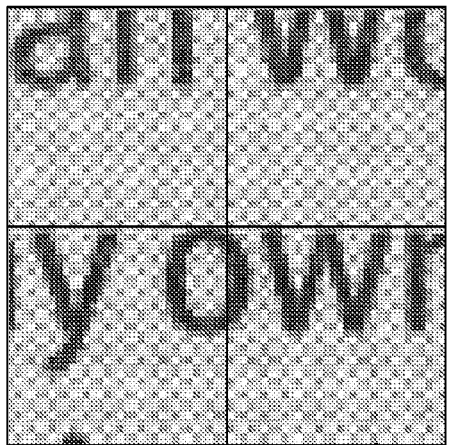
FIG. 18(a) to 18(d) represent one example of non-halftoned text on halftoned background.
Figure 18C:
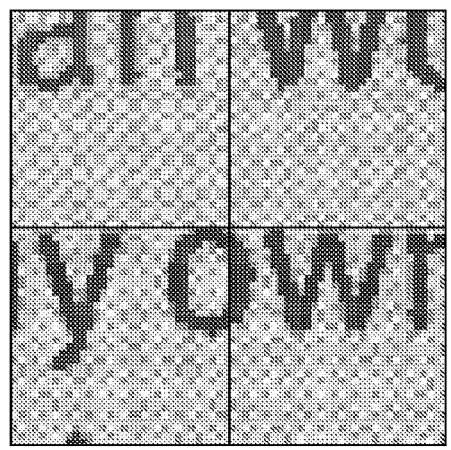
Figure 18B:
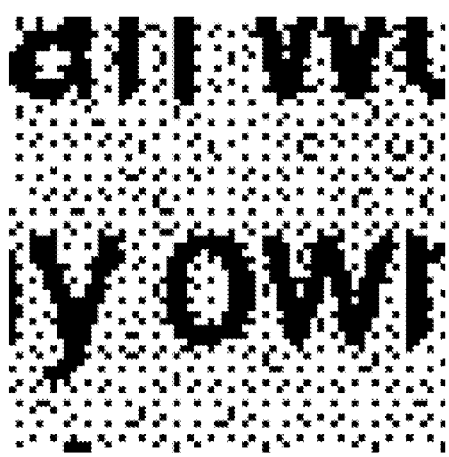
Figure 18D:
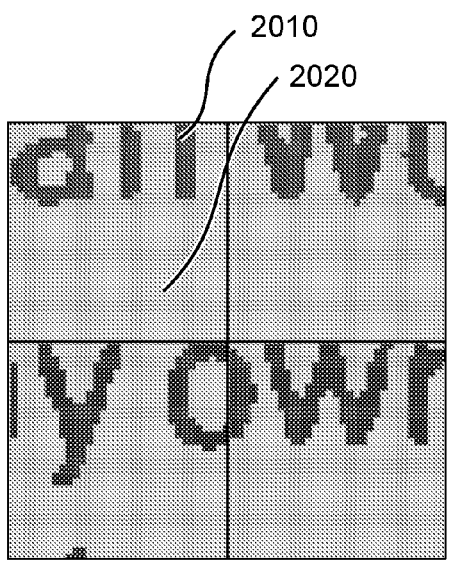

Once the palette is produced, step 140 performed by the processor 2205 according to instructions in the software application 2125, Find Dominant Colors, creates a set of dominant colors from the color palette to represent the dominant information bearing elements in the tile. Due to the physical size of a tile (2.7 mm*2.7 mm, being 32×32 pixels at 300 dpi), a tile normally can be represented with less than five dominant colors without losing the information bearing elements. For example, a tile with black and pink text on white background will need three dominant colors to represent the information bearing elements. FIG. 17(*d*) shows an image portion having three dominant colors (1910, 1920 and 1930) that represent the information bearing elements (two different colored text items 1910 and 1930 and a background color 1920). FIG. 18(*d*) shows an image portion with two dominant colors (2010 and 2020) that represent the information bearing elements (text 2010 and background 2020). A tile in a photograph or graphics region may need more than four dominant colors to represent the tile more visually correctly. However since the colors in the image regions are not important from the perspective of document analysis, applying a limitation of the number of dominant colors per tile generally does not pose a problem in respect of loss of image quality, however such can improve processing performance.

Returning to FIG. 1, step 150, performed by the processor 2205 according to instructions in the software application 2125, Quantise to Dominant Colors, follows in which each pixel in a tile is color quantized to one of the dominant colors and a quantized map is produced. The quantized map forms a record of the information bearing elements for document image analysis. However the information bearing elements are often polluted by the noise introduced through the printing and scanning process. Noise reduction on the quantized map is desirable to filter out the noise from the information bearing elements so that the document image analysis can produce better results. Subject to the quantity and distribution of quantized colors in the map, the preceding steps operate to identify at least pixels of each tile as noise colors and non-noise colors, the noise colors being one of halftone noise, texture noise and bleeding noise.

In Step 160, performed by the processor 2205 according to instructions in the software application 2125, Noise Reduction, the quantized map is examined for halftone, bleeding and texture noise. Because the information bearing elements, from the perspective of document image analysis, are text, tables or drawings, if any of the noise is found, the existing dominant colors will be modified in order to remove the noise. Noise can be suppressed by reducing the number of dominant colors. For example black text on white background should be represented by two dominant colors—black and white. However in reality step 140 may produce three dominant colors—black, grey and white due to bleeding noise. If such noise is not removed before the actual document analysis takes place, the grey portion can either be merged to the black or white information bearing elements by the text analysis. In either case, the text quality is affected because the text will look either too thick or too thin. When the grey portion is removed through the pixel segmentation process by removing the grey dominant color, the pixel segmentation quality is much better because the grey portion is evenly distributed between the black and white.

Step 170, performed by the processor 2205 according to instructions in the software application 2125, then checks whether the number of dominant colors has changed. This is achieved by ascertaining the number of dominant colors remaining at step 160. In this regard, step 130 starts with a palette of 32 colors, and step 140 reduces that to a maximum of 4 colors. Step 160 can reduce that number further to between 1 and 3 colors depending on the pixel content of the tile. If the number of dominant colors has changed, the previously described process Quantized to Dominant Colors is performed again in step 180, performed by the processor 2205 according to instructions in the software application 2125, to re-quantise pixels to the new set of dominant colors. Step 190 then decides whether there are more tiles to be processed. If so, processing returns to step 130. If not, the processing of the method 100 ends.

Each processing step and module in FIG. 1 will be described in further detail.

Color Histogram

Figure 2:
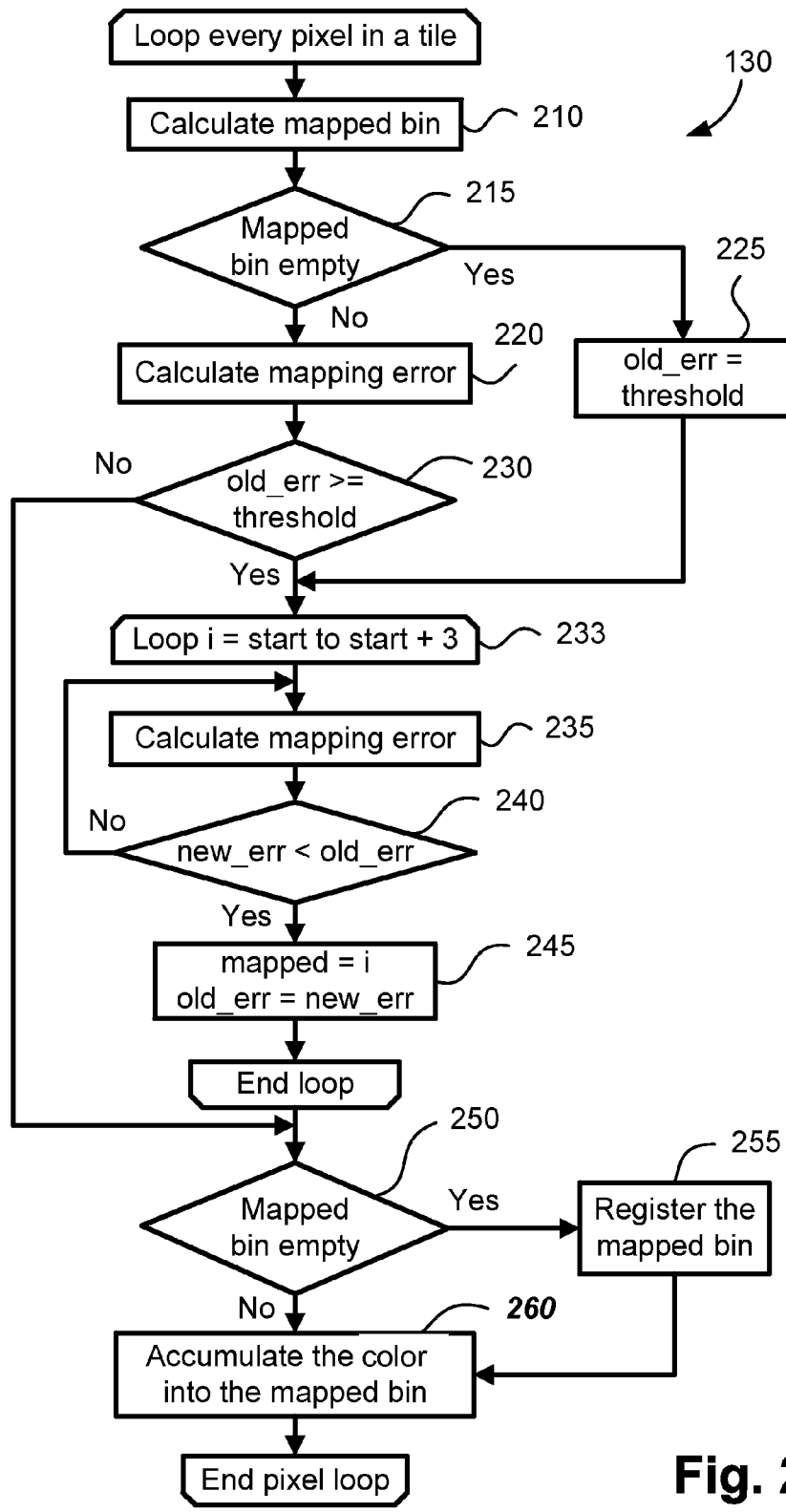
FIG. 2 is the processing flow chart of the "Color Histogram" step of FIG. 1.

FIG. 2 shows the processing steps of Color Histogram step 130 which reduces the continuous tone input image in a tile (32×32 of YCbCr pixels) into an indexed image. The color histogram module 130 produces a palette of approximate colors after all pixels in a tile are examined once in pixel raster order. The color histogram is formed of 32 bins arranged in 8 luminance bands and 4 color columns. Each input pixel is placed into one of the 32 bins by a predetermined mapping method. Each color bin has a color accumulator, a pixel counter and a registration ID which is set by the YCbCr value of the first pixel placed into the bin. The predetermined mapping method may be changed depending on the composition of the pixels in a tile. As a result, there is no predetermined color for each bin. The palette is decided by the pixel composition and the order by which the colors of pixels are processed.

The process of step 130 is performed for each pixel in a tile and starts with step 210, where a predetermined mapping is calculated using the equation below.

band=$Y$/32 column=($|U-\text{REF\_}U|+|V-\text{REF\_}V|$)*NORMALIZING_FACTOR[band]

mapped=band*8+column

The values of REF_U and REF_V are the chrominance of grey: that is REF_U=128 and REF_V=128 for 8-bit RGB input data. NORMALIZING_FACTOR for each band is pre-calculated using the chosen REF_U and REF_V for normalising each band into 4 bins from the RGB color space. The NORMALIZING_FACTOR can be generated using, for example, the 17 numbered lines of the pseudo code below.

```
1    Set max_dist [0:7] to 0
2    for each r in 0 to 255
3    {
4        for each g in 0 to 255
5        {
6            for each b in 0 to 255
7            {
8                c = RGB2YUV(r, g, b);
9                band = c.y / 32;
10               dist = |c.u - REF_U| + |c.v - REF_V|;
11               if (dist > max_dist [band])
12                   max_dist [band] = dist;
13           }
14       }
15   }
16   for each band in 0 to 7
17       NORMALISING_FACTOR [band] = (1 / max_dist
         [band]) * 4
```

As each pixel is examined and assigned to a bin once only, each bin is registered with the color value of the first pixel being placed into the bin. To prevent using up the bins in a band prematurely, step 215 checks whether the mapped bin is empty before placing a new pixel into the bin. If the mapped bin is empty, the process continues to step 225 where value "threshold" is assigned to old_err as the mapping error. Setting old_err to threshold will make the mapped bin the preference for placing the current pixel unless a non-empty bin with mapping error less than "threshold" is found. "Threshold" is defined as ⅛ of max_dist in each band as defined in the pseudo code above.

If the mapped bin is not empty, the process continues to step 220 to calculate the mapping error as min(|u−bin [mapped].u|, |v−bin[mapped].v|), where (u, v) are the chrominance values of the current input pixel and (bin [mapped].u, bin[mapped].v) are the registration ID of the mapped bin. Next the process continues to step 230 where the mapping error is compared against the threshold. If the mapped bin has mapping error below the threshold, process continues to step 250. Otherwise the process continues to step 233 where a search starting from column 0 to 3 on the mapped band is performed to find a bin with the smallest mapping error. Step 233 starts a local loop and step 235 which follows calculates the mapping error in the same fashion as performed in step 220. Step 240 compares the calculated error, new_err, with old_err (which may be "threshold" if the mapped bin is empty) If new_err is smaller than old_err, step 245 identifies the loop increment "i" as the mapped value, otherwise the loop continues to the next value. When the local loop 233 ends, "mapped" is the final mapped bin. Step 250 follows.

In step 250, the mapped bin is checked again to determine if it is empty. If the mapped bin is empty, the mapped bin is registered at step 255 with the (u, v) values of the current input pixel. Otherwise the process continues to step 260 where the color values of the current input pixel are accumulated to the mapped bin and the pixel count of the mapped bin is incremented. The bin mapping for each pixel is recorded as a 5-bit index and it forms an indexed map after a whole tile is processed. At the end of the pixel loop, the palette is generated from the average colors of the non-empty bins, thereby concluding the histogram step 130.

Find Dominant Colors

Figure 3:
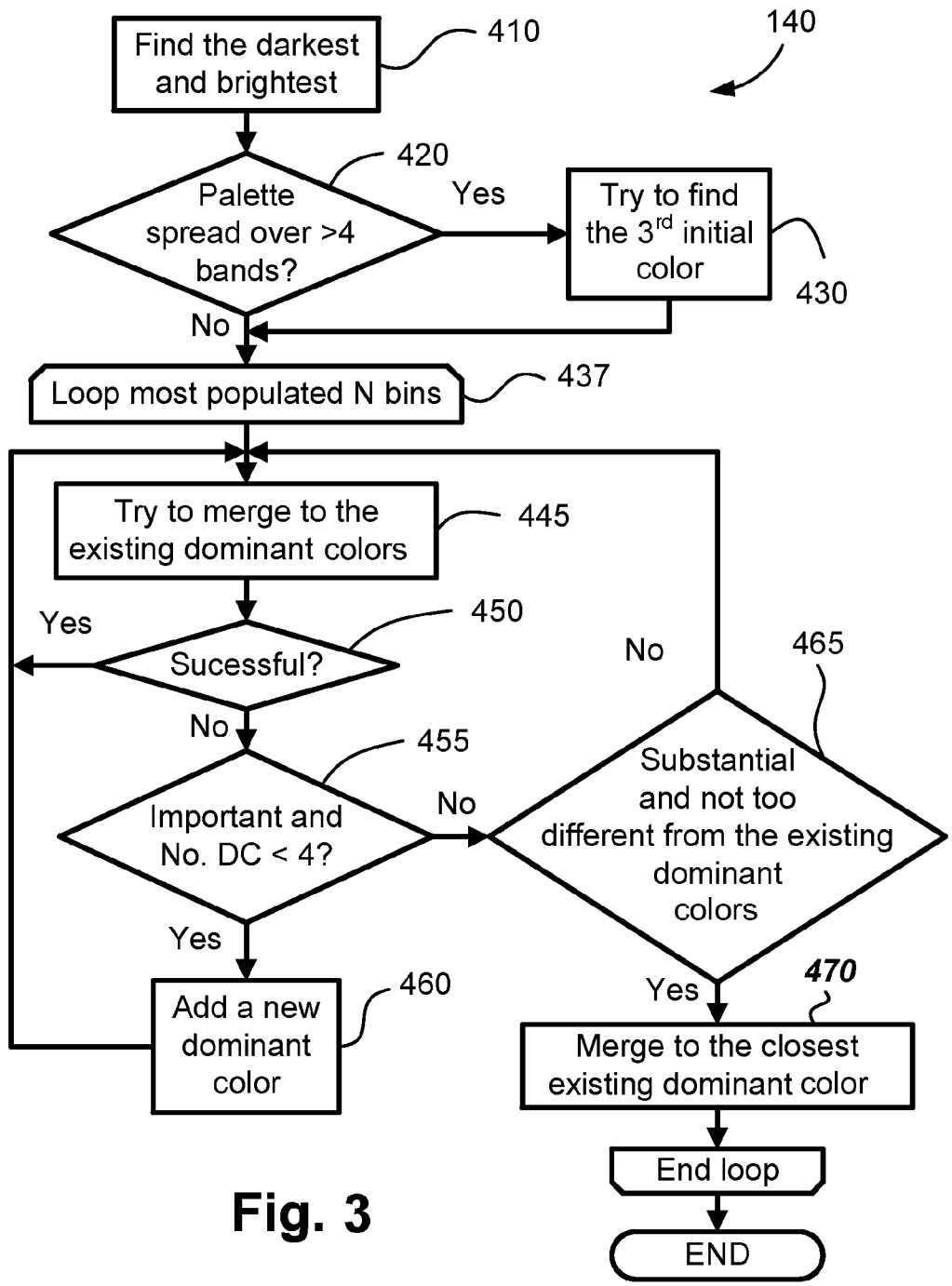
FIG. 3 is the processing flow chart of the "Find Dominant Colors" step of FIG. 1.

FIG. 3 shows the processing steps of Finding Dominant Colors step 140 from the palette produced by the Color Histogram step 130. The process 140 determines the dominant colors to represent the information bearing elements for the current tile. The process 140 involves finding the initial colors from the palette and a sequence of refinement steps. Initially step 410 indentifies two initial colors, color0 and color1, being the darkest and brightest colors of the palette. Step 420 then checks if the palette spreads more than four bands. When the palette spreads more than four bands, there is a higher chance that the tile may need three dominant colors to represent the information bearing elements. The third initial color selection is essential since it will pick up an important but not densely populated color from the palette as a dominant color. If the palette spreads over more than 4 bands, step 430 searches for the third initial color by testing each of the remaining palette colors using the condition below. If palette [n] satisfies the condition, palette[n] is chosen as the third initial color. In the remaining description, uv_dist(C1, C2) is defined as $|C1.u-C2.u|+|C1.v-C2.v|$ where C1 and C2 are two colors.

Condition: diff0=uv_dist(|palette[n], color0), and
diff1=uv_dist(|palette[n], color1)
where diff0>20 && diff1>20 && (diff0+diff1)>100

Step 437 then identifies a loop that refines the initial colors to the final dominant colors. The refinement only uses the most populated N bins that are not already included in the initial colors. The selection of N depends on the number of palette colors. The most populated N bins are denoted as P[N] where N ranges from 4 to 6. In step 445, bin color P[i] may be merged to the existing dominant colors. The color distance between P[i] and each of the existing dominant colors is calculated and if the distance is smaller than a predefined threshold (e.g., 20), P[i] is merged to that existing dominant color. Step 450 then checks if the merging attempt in step 445 was successful. If yes, the processing continues for the next color, P[i+1]. Otherwise the processing proceeds to step 455 to check if P[i] is very important. A palette bin is considered important if its color difference to each of the existing dominant colors is greater than a predefined threshold (e.g., 255), and its pixel count is also greater than a predefined threshold (e.g., 30). If P[i] is important and the number of dominant colors (DC) is less than 4, a new dominant color is created from P[i] in step 460. Otherwise the processing proceeds to step 465. If P[i] is substantial in the pixel count (e.g., pixel count greater than 37) and its color difference to each of the existing dominant colors is less than a predefined threshold (e.g., 53) P[i] is merged in step 470 to one of the existing dominant colors with the closest color distance. Otherwise P[i] is discarded and the processing continues by returning to step 445 for the next color, P[i+1]. Discarding insubstantial palette colors can produce less polluted dominant colors. When the most populated N bins are all processed, the dominant color generation process 140 is complete.

Quantise To Dominant Colors

Figure 4:
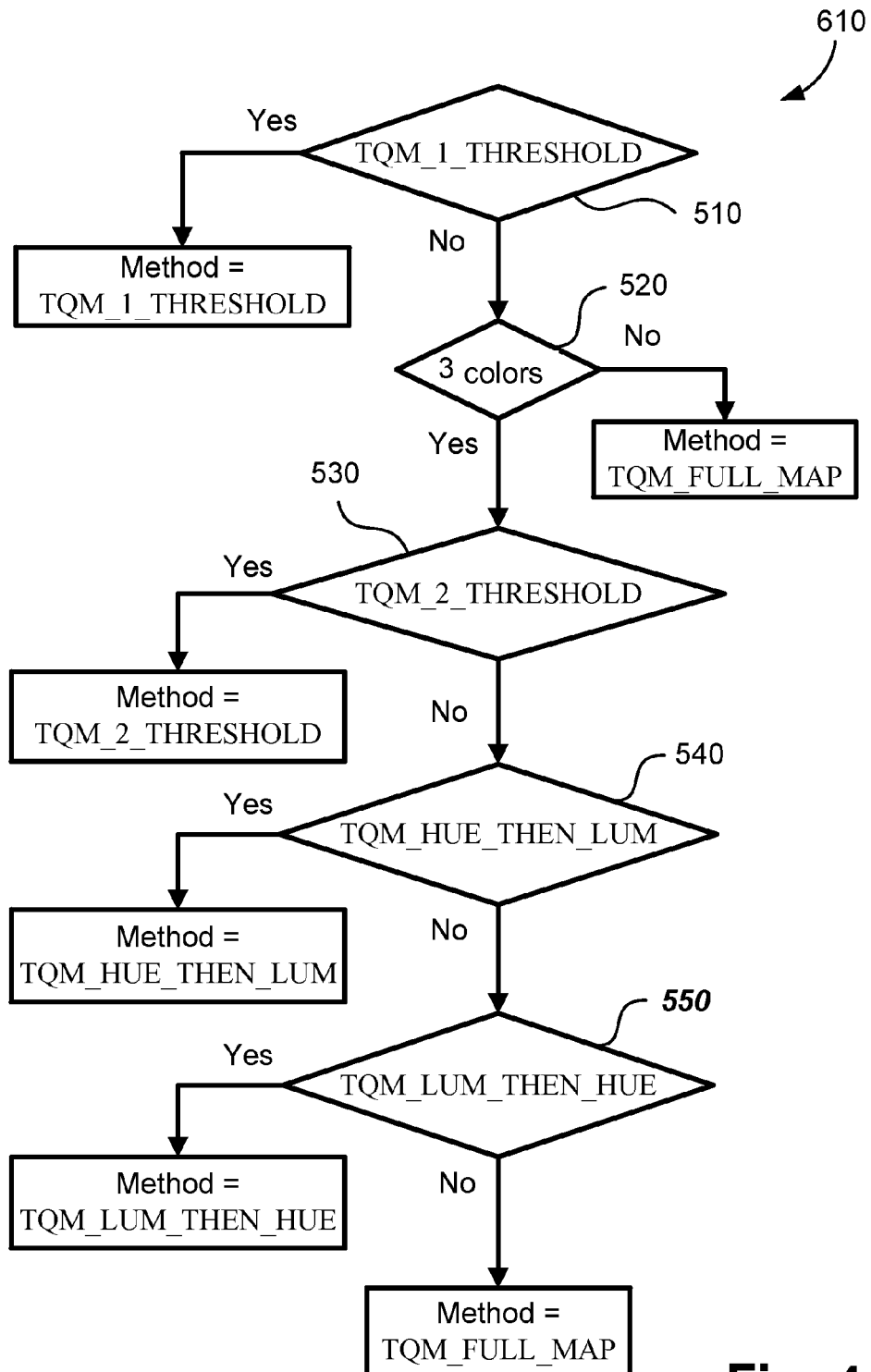
FIG. 4 is the decision flow chart of choosing a quantization method for use in step 150 and step 160 of FIG. 1.

The quantising to dominant colors processes of steps 150 and 180 involves selecting a suitable quantization method and quantising pixels using the selected quantization method. There are five methods of quantising pixels to the dominant colors, the choice of which depends on the composition of the dominant colors. FIG. 4 shows a process 610 for choosing the quantization method. The four pre-determined dominant color compositions determined in step 140 are tested in sequence as shown in Table 1 below. Dominant colors are named C0, C1, C2 and C3, where C0 is the darkest and C1 is the brightest. When the dominant color composition does not satisfy any of the four pre-determined dominant color compositions, a TQM_FULL_MAP method is used. Each of the quantization methods will be explained in further details in the next paragraph.

TABLE 1

| Condition name | Color composition | Condition |
| --- | --- | --- |
| TQM_1_THRESHOLD | Two colors with distinctive luminance difference | 2 dominant colors AND (C1.y − C0.y) > 50 |
| TQM_2_THRESHOLD | Three colors with distinctive luminance difference but less chrominance difference | 2 dominant colors AND (C1.y − C0.y) > 50 |
| TQM_HUE_THEN_LUM | Three colors, C2 has distinctive chrominance difference to C0 and C1 and its luminance is close to the average of C0 and C1 | 3 dominant colors AND $|C2.y - avg(C0, C1).y|$ < 30 AND uv_dist(C2, C0) > 40 AND uv_dist(C2, C1) > 40 |
| TQM_LUM_THEN_HUE | Three colors, C2 has distinctive chrominance difference to either C0 or C1 and its luminance is close to either C0 or C1 | 3 dominant colors AND $|C2.y - avg(C0, C1).y|$ >= 30 AND ( uv_dist(C2, C0) > 40 OR uv_dist(C2, C1) > 40 ) |

The sequence of testing noted above and indicated in Table 1 is illustrated in FIG. 4 where the process 610 initially tests two dominant colors against TQM_1_THRESHOLD in step 510. Where this is not met, the three dominant colors are tested in step 520. If none satisfy, the TQM_FULL_MAP method is required. If the three colors do satisfy, these are progressively tested at steps 530, 540 and 550 to ascertain which other method is to be selected.

Figure 5:
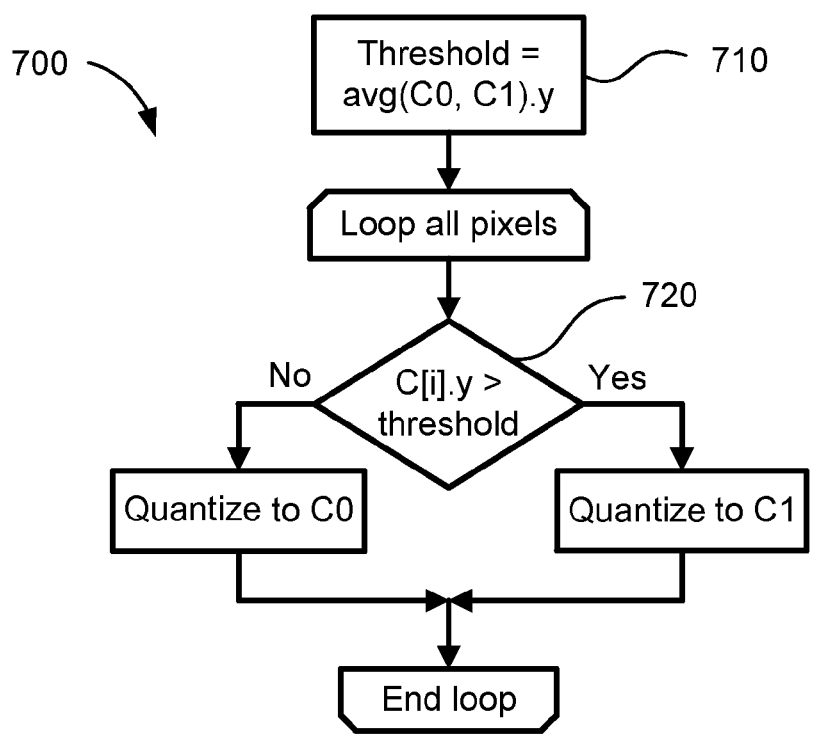
FIG. 5 is the processing flow chart of pixel quantization using TQM_1_THRESHOLD method.

FIG. 5 shows the quantization processing steps 700 of the TQM_1_THRESHOLD method. In step 710 a threshold is calculated from the average luminance of C0 and C1. The process then enters a pixel loop. In step 720, the luminance value of the current pixel C[i] in the tile is compared against the threshold calculated in step 710. If the result is greater, the current pixel is quantized to color C1 and '1' is output as the quantized label. Otherwise the current pixel is quantized to color C0 and '0' is output as the quantized label.

Figure 6:
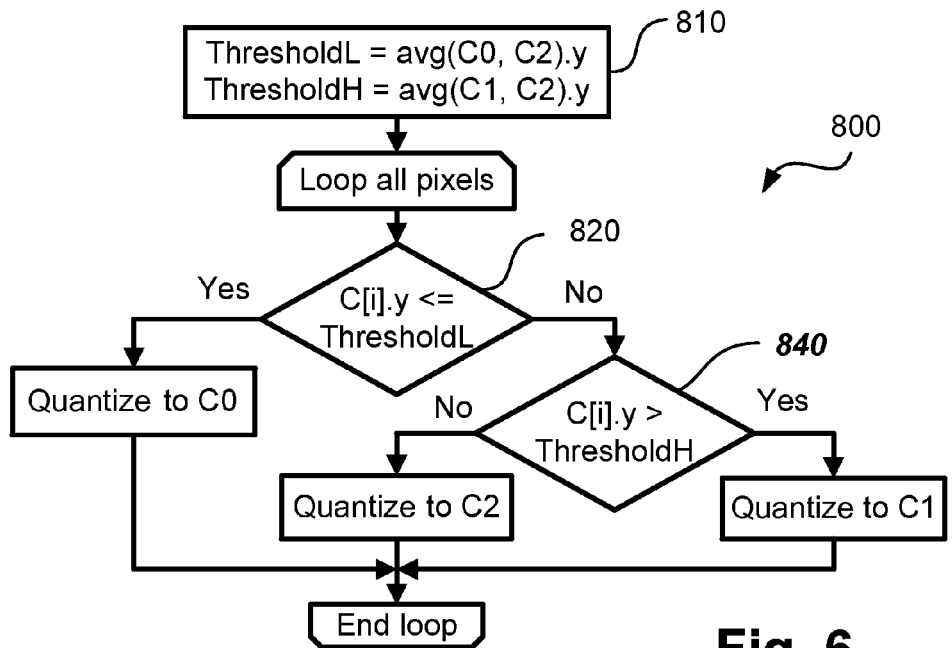
FIG. 6 is the processing flow chart of pixel quantization using TQM_2_THRESHOLD method.

FIG. 6 shows the quantization processing steps 800 of the TQM_2_THRESHOLD method. In step 810, two thresholds are calculated. The process then enters a pixel loop for each pixel in the tile. In step 820, the luminance value of the current pixel C[i] is compared against the lower threshold, ThresholdL. If the result is smaller, the current pixel is quantized to color C0 and '0' is output as the quantized label. Otherwise the processing advances to step 840 and compares the luminance value of the current pixel C[i] against the higher threshold, ThresholdH. If the result is greater, the current pixel is quantized to color C1 and '1' is output as the quantized label. Otherwise the current pixel is quantized to color C2 and '2' is output as the quantized label.

Figure 7:
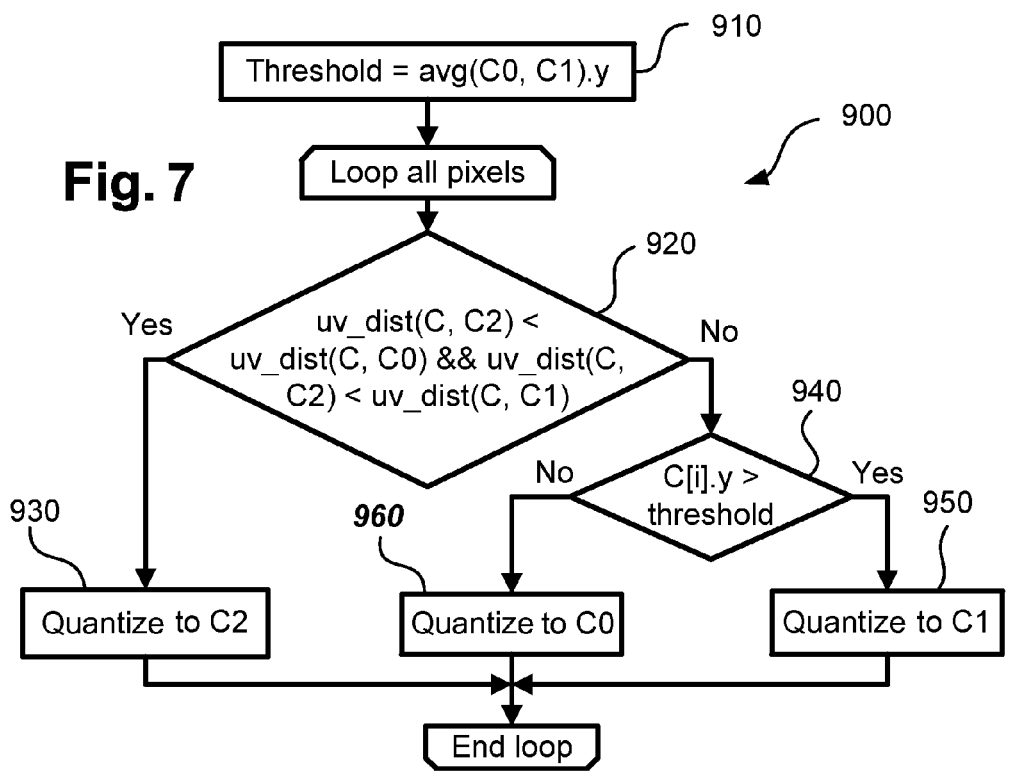
FIG. 7 is the processing flow chart of pixel quantization using TQM_HUE_THEN_LUM method.

FIG. 7 shows the quantization processing steps 900 of the TQM_HUE_THEN_LUM method. In step 910 a threshold is calculated from the average luminance of colors C0 and C1. The process then enters a pixel loop over all pixels in the tile. In step 920 the chrominance distance from the current pixel C[i] to colors C0, C1 and C2 are calculated and compared. If it is closest to color C2, the current pixel is quantized to color C2 and '2' is output as the quantized label. Otherwise the processing advances to step 940 and compares the luminance value of the current pixel C[i] against the threshold. If the result is greater, the current pixel is quantized to C1 and '1' is output as the quantized label. Otherwise the current pixel is quantized to color C0 and '0' is output as the quantized label.

Figure 8:
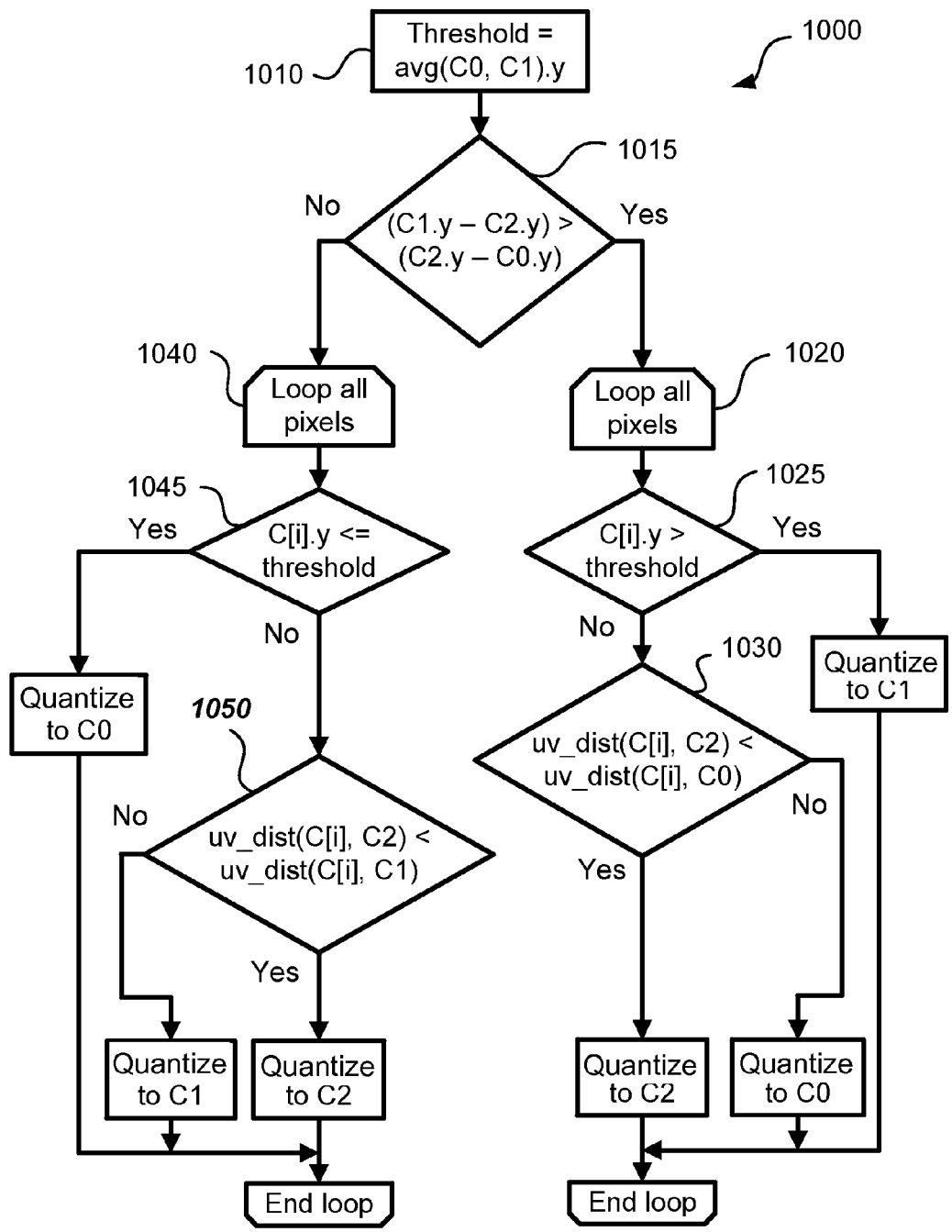
FIG. 8 is the processing flow chart of pixel quantization using TQM_LUM_THEN_HUE method.

FIG. 8 shows the quantization processing steps 1000 of the TQM_LUM_THEN_HUE method. In step 1010 a threshold is calculated from the average luminance of colors C0 and C1. In step 1015 the luminance of color C2 is compared against colors C0 and C1. If it is closer to color C0, the process 1000 enters the pixel loop in step 1020. Otherwise the process enters the pixel loop in 1040, both loops being performed over all pixels in the tile. In step 1025 the luminance of the current pixel C[i] is compared against the threshold. If it is greater, the current pixel is quantized to color C1 and '1' is output as the quantized label. Otherwise the process continues to step 1030 and compares the chrominance distance between the current pixel to color C0 and to color C2. If chrominance distance is closer to color C2, the current pixel is quantized to color rC2 and '2' is output as the quantized label. Otherwise the current pixel is quantized to color C0 and '0' is output as the quantized label. In step 1045 the luminance of the current pixel C[i] is compared against the threshold. If it is smaller, the current pixel is quantized to color C0 and '0' is output as the quantized label. Otherwise the process continues to step 1030 and compares the chrominance distance between the current pixel to color C1 and to color C2. If chrominance distance is closer to color C2, the current pixel is quantized to color C2 and '2' is output as the quantized label. Otherwise the current pixel is quantized to color C1 and '1' is output as the quantized label.

For the TQM_FULL_MAP method, the color distances (e.g., Manhattan) for each pixel in the current tile to all dominant colors are calculated. These distances are preferably "Manhattan" distances measured along each axis required to traverse between the pixels. The pixel is then quantized to the dominant color with the smallest distance.

Noise Reduction

Figure 10:
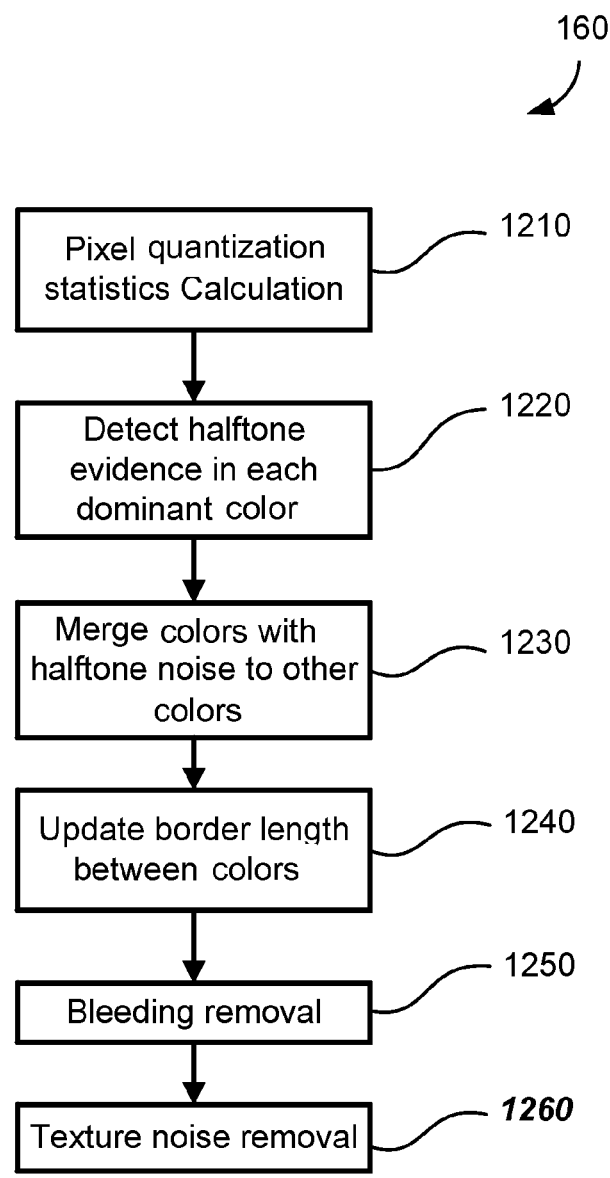
FIG. 10 is a flow chart representing a preferred approach to "Noise Reduction"

FIG. 10 shows the processing flow of Noise Reduction process 160. The input to this module is a quantized map with labels representing the dominant colors of each pixel. FIG. 9 is an example of a quantized map for a tile, in this case, an 8×8 tile having three dominant colors C0, C1 and C2. The noise reduction processing of FIG. 10 starts from step 1210 where pixel quantization statistics are calculated. Pixel quantization statistics represent a matrix of data of the fragmentation of the dominant colors in a tile. In the particular described embodiment, the fragmentation matrix data and statistics include an edge ratio for each quarter of the tile, an edge ratio for the whole tile, a border length between colors, a pixel count for each quarter of the tile and a pixel count for the whole tile. The edge ratio is defined as the number of border counts divided by the number of pixels for a dominant color.

FIG. 11 shows examples of edge ratios for an 8×8 tile with four dominant colors C0, C1, C2 and C3. The tile in this example may be from an image portion (cf. text portion) of a scanned compound document and the edge ratios for the tile are seen to form an C×5 matrix representing the fragmentation of the regions of dominant colors wherein C is the number of dominant colors and 5 denotes the whole tile edge ratio and four quarter tile edge ratio for each dominant color. The borders are highlighted in black and limited to within the tile only. The borders define regions within the tile of pixels quantized to each dominant color. The border length of a color C0 is 20 and the pixel count of the color C0 is 15, being the number of pixels enclosed by the corresponding border/region. As a result the edge ratio is 20/15. Edge ratio indicates the degree of pixel fragmentation. The higher the edge ratio is the more fragmented a dominant color is. The fragmentation indicates the noise state of the current tile. Edge ratios are calculated in every quarter of the tile and the whole tile for each dominant color. The edge ratio statistics for each dominant color in this example are also shown in FIG. 11. The border length between colors is denoted as edge[color1]_[color2]. For example border length between colors C0 and C1 is denoted as edge0_1 as shown in FIG. 11.

After the pixel quantization statistics are calculated, the process 160 of FIG. 10 proceeds to step 1220 to detect halftone noise for each dominant color as described below. The output of step 1220 is the existence of halftone noise found in each dominant color. Next in step 1230, the dominant colors with halftone noise are merged to other dominant colors. Once the dominant colors with halftone noise are merged, and the border lengths between those merged dominant colors are updated in step 1240. The process 160 then continues to step 1250 to remove bleeding noise, if it exists, as described below. Next in Step 1260, texture noise will be removed if it exists. The details of each step will be explained further next.

Figure 12:
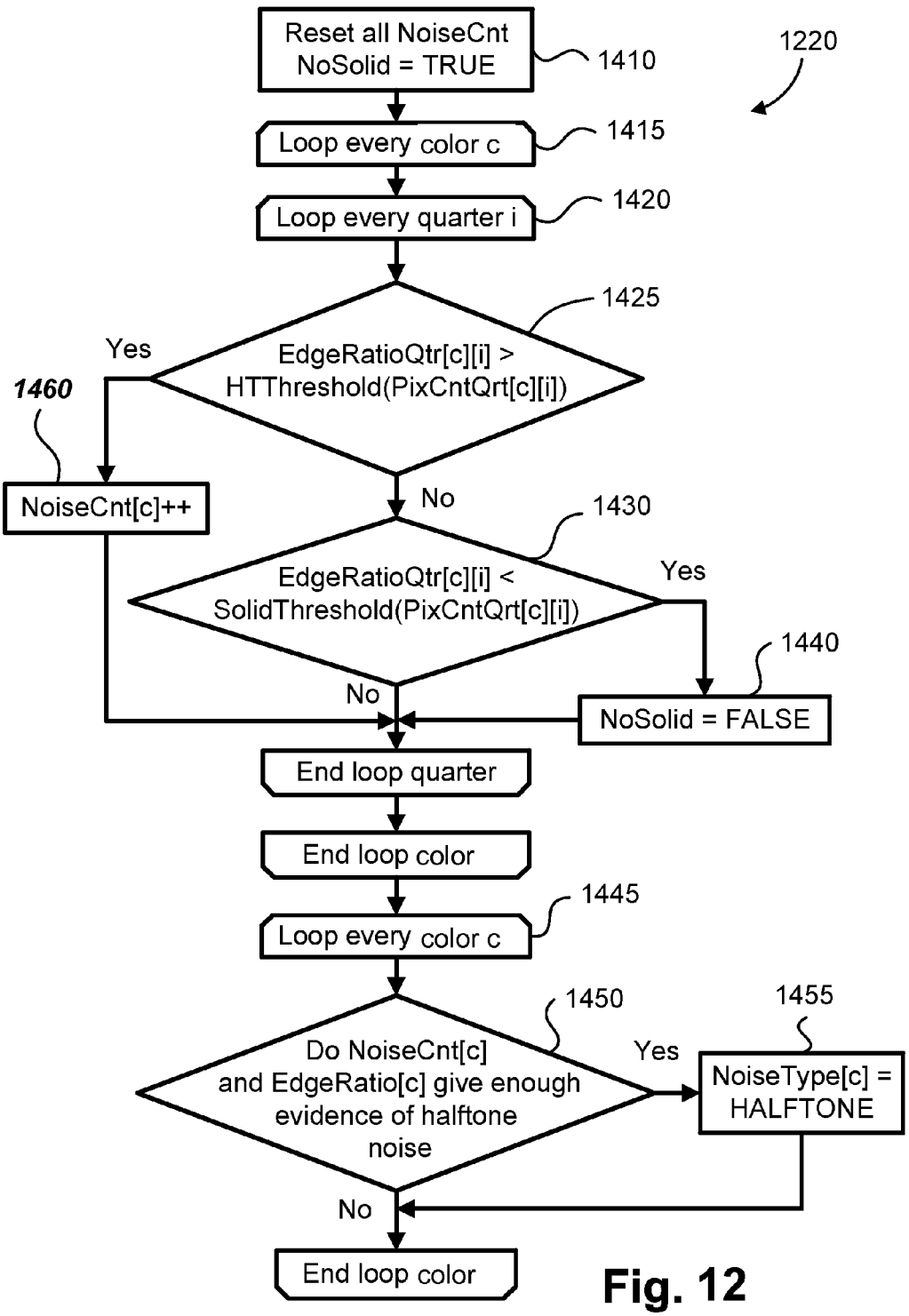
FIG. 12 is a processing flow chart of detecting halftone evidence in each dominant color in the method of FIG. 10.

FIG. 12 shows the details of step 1220. The existence of halftone noise is determined by the fragmentation state of each dominant color in each quarter of the tile and as a whole. The process 1220 starts from step 1410 where variables NoiseCnt and NoSolid are reset. NoiseCnt indicates how many quarters are fragmented. NoSolid is a flag indicating the whole tile is fragmented. Each dominant color is tested for halftone noise evidence in turn in step 1415. A loop over each quarter in step 1420 tests the quarter fragmentation state for the current dominant color where NoiseCnt and NoSolid are updated according to the statistics obtained from step 1210. In step 1425 the quarter edge ratio, EdgeRatioQtr, for each dominant color is compared against a threshold. If it is greater than the threshold, NoiseCnt for the dominant color is incremented. The threshold is a function of the quarter pixel count. Otherwise the process 1220 enters step 1430 and compares EdgeRatioQtr against another threshold for solidness testing. If it is smaller, NoSolid is set to false. Once the process finishes checking all quarter edge ratios for every dominant color, it enters another color loop, formed by step 1445, to consolidate the halftone noise evidence for each dominant color. If NoiseCnt is higher than a threshold or EdgeRatio is higher than another threshold, NoiseType is set to HALFTONE.

Figure 13:
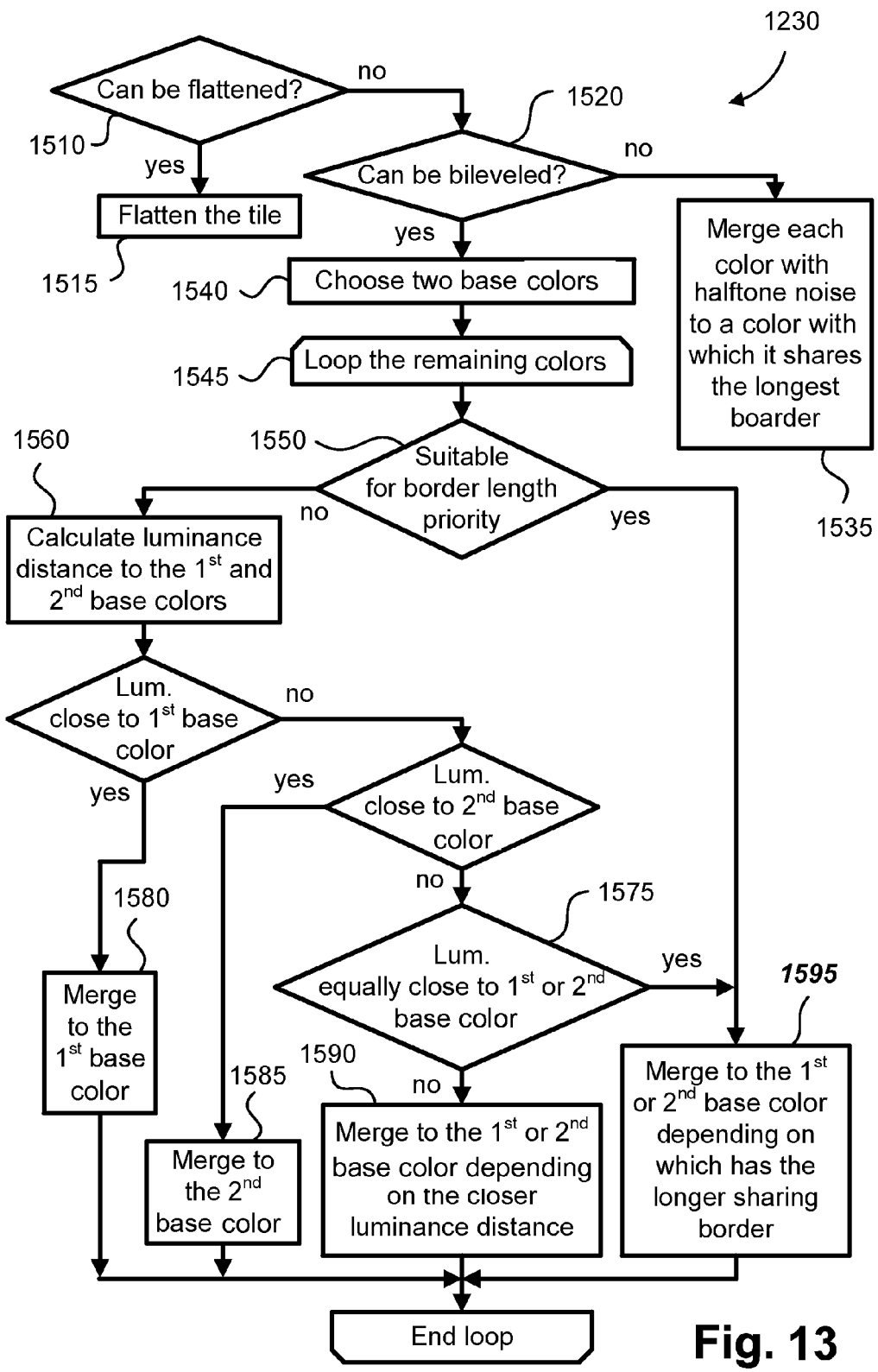
FIG. 13 is a processing flow chart of merging colors with halftone noise to other colors in the method of FIG. 10.

FIG. 13 shows the details of step 1230 of FIG. 10. The process starts from step 1510 to test whether the tile can be flattened. Flattening involves reducing the number of dominant colors to a single, solid color. Specifically, when NoSolid is true and the number of halftone noise colors equals to the number of dominant colors, the test of step 1510 is satisfied and the tile is flattened to an average color of all colors in the tile in step 1515. Otherwise the process advances to step 1520 to test whether the tile should be made bi-level. When the number of halftone noise colors is one less than the number of dominant colors, or there is one halftone noise color among three dominant colors, the tile is made bi-level. Step 1540 and loop 1545 form the bi-level process which starts by choosing two base colors in step 1540. Colors C0 and C1 are the default two base colors. Color C0 is be replaced by color C2 if its pixel count is smaller than color C2 and the pixel count of color C1 is more than twice of color C0. If color C0 is not replaced, the same test is applied to color C1. Next the process 1230 enters loop 1545 to merge the remaining colors to the two base colors. The colors are merged to one of the two base colors based on the following sequence. First, step 1550 tests the border length of the edge between the two dominant colors, essentially the edge that differentiates the corresponding adjacent regions of dominant color. When the base color with more pixels does not have twice as many pixels as the other one, the color is merged to the base color with the longer shared border in step 1595. Otherwise the process moves to step 1560 to calculate the luminance difference between the current color and two base colors. If the luminance is very close to the $1^{st}$ base color, the current color is merged to the $1^{st}$ base color in step 1580. Otherwise it tests whether the current luminance is very close to the $2^{nd}$ base color. If so, the current color is merged to the $2^{nd}$ base color in step 1585. Otherwise the process moves to step 1575 to decide whether the current color is almost equally close to the $1^{st}$ and the $2^{nd}$ base color in luminance. If so, the color is merged to the base color with the longer shared border in step 1595. Otherwise the color is merged to the base color with closer luminance (Euclidean, i.e. line-of-sight) distance in step 1590. If the tile can not be made bi-level in step 1520, the method 1230 proceeds to step 1535 which operates to merge each color with halftone noise to one of the other colors depending on the longest shared border.

Returning to FIG. 10, once the halftone noise colors are merged, the process 160 continues to step 1240 to update the border length counters and edge ratios. Only the whole tile edge ratios are updated which can be done by updating the border length counters depending on how the dominant colors are merged. For example, Color2 in the FIG. 11 example has been merged to Color1, Edge0_2 is therefore accumulated to Edge0_1 and Edge2_3 accumulated to Edge1_3. The result of the update for the example in FIG. 11 is shown in FIG. 14.

Figure 15:
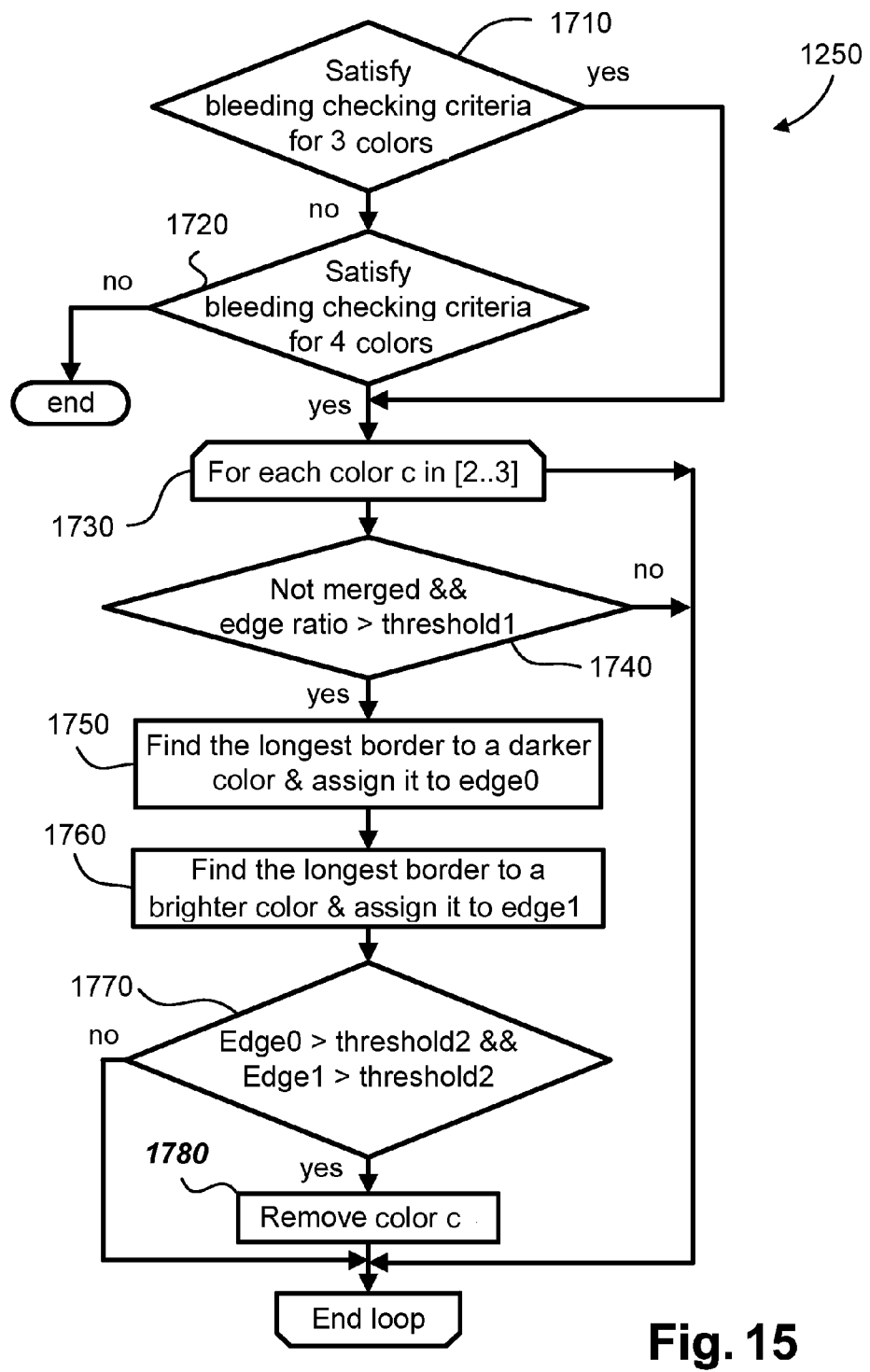
FIG. 15 is a processing flow chart of the bleeding removal step of FIG. 10.

After step 1240, the process continues to step 1250 for bleeding removal, which is shown in detail in FIG. 15. To prevent false bleeding detection, which may result in removing a genuine dominant color, the process 1250 commences with steps 1710 and 1720 to decide whether bleeding removal should be performed on the current tile. For 3 colored tiles, the bleeding removal is only enabled when the 3 color satisfies the following conditions:

---

Small pixel count
AND
(
    Quite different from the $3^{rd}$ dominant colour of the tile above or left
    OR
    Close to the $1^{st}$ dominant colour
    OR
    Close to the $2^{nd}$ dominant colour
)

---

The measures for "quite different" and "close" used in the condition above may be determined using one or more color distance thresholds. The thresholds may be predetermined based upon the type of image or expected colors being detected (e.g., black text on solid color background). Further, a value of "small" may be established or predetermined based on the size of the tile. For example, for an 8×8 tile, "small" may be set to be a region having less than 4 pixels.

For 4 colored tiles, the bleeding removal is only enabled when both the left tile and above tile have less than four colors. If the tile satisfies the bleeding removal conditions, the process continues to step 1730 to check in turn whether colors 2 and 3 are bleeding colors. In this regard, step 1730 operates by which steps 1740-1780 are performed once for color 2, and once for color 3. Otherwise the process 1250 terminates. Step 1740 checks whether the color has not been merged by halftone merging and has a high edge ratio. If not, the process continues to process the next color. Otherwise the process continues to step 1750 and then step 1760 where the longest border length of the current color to a darker color and brighter color are assigned to edge0 and edge1. Next, step 1770 tests whether edge0 and edge1 are both greater than (i.e. exceed) a threshold. The threshold is calculated using the edge count of the current color. If the test is true, the current color is removed at step 1780. Otherwise the process 1250 continues to process the next color until both color 2 and 3 have been processed.

Figure 16:
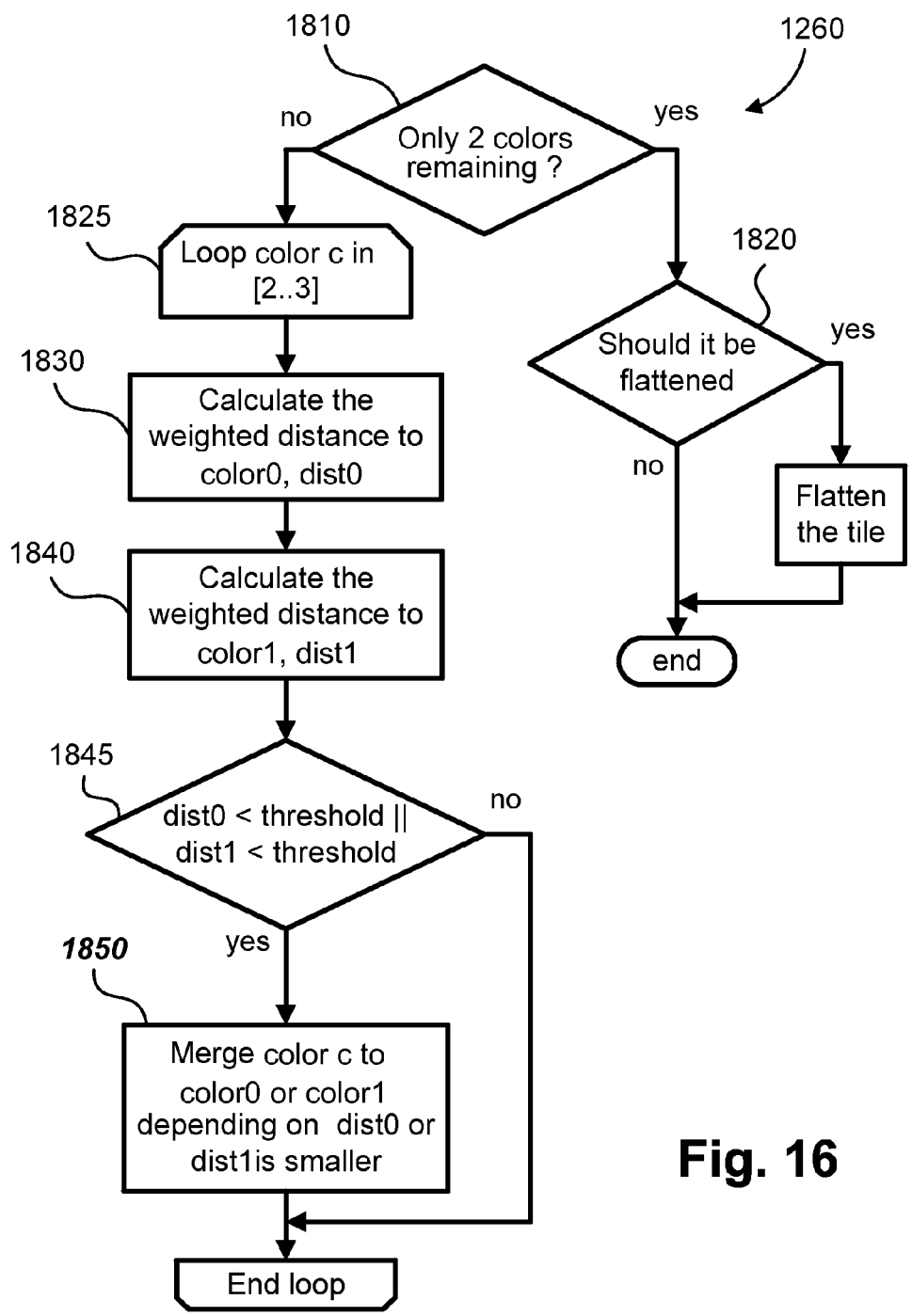
FIG. 16 is a processing flow chart of the texture noise removal step of FIG. 10.

Returning to FIG. 10, after bleeding removal 1250, the noise reduction process 160 continues to step 1260 to remove texture noise, if there is more than one color remaining. Background textures are preferably removed from the pixel segmentation output because they are not information bearing elements. FIG. 16 shows the details of the texture noise removal process 1260. The processing starts at step 1810 by deciding whether to reduce colors or flatten the tile based on whether there are only two remaining dominant colors. When there are only two remaining dominant colors, step 1820 is taken to decide whether the tile can be flattened. When the border length between the two remaining colors is very long and their color distance is not far apart, the tile will be flattened. Otherwise no action is taken and the process 1260 ends. When there are still more than two remaining dominant colors (i.e. 3 or 4 colors), a loop 1825 is performed to reduce colors. Steps 1830 and 1840 calculate the weighted distances, dist0 and dist1, to color0 and color1 respectively for color c. The weighted distance is the color distance scaled by the shared border length between color0 or color1 and color c and their pixel count difference. Next the process moves to step 1845. If dist0 or dist1 is smaller than a threshold, color c is merged to color0 or color1 in step 1850. Otherwise the process continues to the next color until all colors have been processed.

As a consequence of the processing described above, various forms of noise in a pixel-based image can be detected and reduced in a fashion that permits a modified image to be more readily segmented. This can aid pixel classification for OCR and may also be used for optimised image compression. The block-based processing performed upon tiles of the image accommodates and allows the processing to adapt to a range of colors and classes across the entire image with pixel level granularity.

INDUSTRIAL APPLICABILITY

The arrangements described are applicable to the computer and data processing industries and particularly for the removal of noise from images required to be segment or classified to permit easier and more reliable segmentation and classification.

The foregoing describes only some embodiments of the present invention, and modifications and/or changes can be made thereto without departing from the scope and spirit of the invention, the embodiments being illustrative and not restrictive.

The invention claimed is:

1. A method of detecting noise in an image of a compound document, the image comprising pixels representing at least text data and image data used to form the compound document, the noise comprising at least one of halftone, bleeding and texture noise, the method comprising the steps of:
   (a) partitioning the image into a plurality of tiles each formed of a plurality of pixels;
   (b) determining a set of dominant colors for each of the tiles and associating each pixel with one of the determined dominant colors to form a plurality of dominant color regions;
   (c) determining, for each of the dominant color regions, a fragmentation statistic representing a fragmentation of the dominant color region, the fragmentation statistic including an edge ratio of a border pixel count to a number of pixels of the dominant color; and
   (d) applying a threshold to each of said fragmentation statistics of the dominant color regions to detect the at least one of halftone, bleeding and texture noise in the corresponding dominant color in the tile.

2. A method according to claim 1, wherein step (b) comprises quantising a color of pixels to one of said dominant colors.

3. A method according to claim 1, wherein step (c) comprises determining for each tile a fragmentation matrix representing a statistic for each of said dominant colors.

4. A method according to claim 3, wherein the fragmentation statistic comprises five edge ratios for each of said dominant colors.

5. A method according to claim 1, wherein step (c) comprises identifying borders between two of the dominant colors and forming a region associated with each of said dominant colors in each quarter of a tile and a whole tile.

6. A method according to claim 1, wherein the method is performed in a raster fashion of the tiles in the image.

7. A method of reducing noise in an image of a compound document, said noise comprising at least one of halftone, bleeding and texture noise, said method comprising the steps of:
   (1) detecting noise in said image according to the method of claim 1, said detecting thereby identifying at least pixels of each of said tiles as pixels having colors with noise and pixels having color without noise, the noise being one of halftone noise, texture noise and bleeding noise;
   (2) processing the color of each of said tiles by:
      (2a) merging each of the colors with noise to one of said colors without noise if the noise is halftone noise or texture noise;
      (2b) removing the colors with noise if the noise is bleeding noise; and
   (3) quantising the pixels of the tile to those remaining dominant colors of said set.

8. A method according to claim 7, wherein the step of determining for each dominant color a fragmentation statistic comprises identifying a border forming a region associated with each of said dominant colors and the fragmentation statistic comprises a measure of a distance about each said region, wherein step (2a) comprises merging the color of a first region with the color of an adjacent second region sharing a longest border.

9. A method according to claim 7, wherein step (2a) comprises comparing a luminance distance between a region having one dominant color and adjacent regions with each having other dominant colors and merging colors of the regions with the smaller luminance distance.

10. A method according to claim 7, wherein step (2b) comprises comparing a luminance difference between a current region and adjacent brighter and darker regions against a threshold and removing the current color where both luminance differences exceed the threshold.

11. A method according to claim 10, where the threshold is adapted based on an edge count of the current color.

12. A computer apparatus for detecting noise in an image of a compound document, said image comprising pixels representing at least text data and image data used to form the compound document, said noise comprising at least one of halftone, bleeding and texture noise, the apparatus comprising:
   means for partitioning the image into a plurality of tiles each formed of a plurality of pixels;
   means for determining a set of dominant colors for each of said tiles and associating each pixel with one of the determined dominant colors to form a plurality of dominant color regions;
   means for determining, for each of the dominant color regions, a fragmentation statistic including an edge ratio of a border pixel count to a number of pixels of the dominant color; and
   means for applying a threshold to each of said fragmentation statistics of the dominant color regions to detect the at least one of halftone, bleeding and texture noise in the corresponding dominant color in the tile.

13. A computer apparatus according to claim 12, further comprising:
   means for processing the colors of each of said tiles by:
      (a) merging each of the colors with noise to one of said colors without noise if the noise is halftone noise or texture noise; and
      (b) removing the colors with noise if the noise is bleeding noise; and
   means for quantising the pixels of the tile to those remaining dominant colors of said set, to thereby reduce noise in the image of the compound document.

14. A non-transitory computer readable storage medium having a computer program recorded thereon, said program being executable in a computer to detect noise in an image of a compound document, said image comprising pixels representing at least text data and image data used to form the compound document, said noise comprising at least one of halftone, bleeding and texture noise, the program comprising:
   code for partitioning the image into a plurality of tiles each formed of a plurality of pixels;

code for determining a set of dominant colors for each of said tiles and associating each pixel with one of the determined dominant colors to form a plurality of dominant color regions;

code for determining, for each of the dominant color regions, a fragmentation statistic including an edge ratio of a border pixel count to a number of pixels of the dominant color; and code for applying a threshold to each of said fragmentation statistics of the dominant color regions to detect the at least one of halftone, bleeding and texture noise in the corresponding dominant color in the tile.

15. A non-transitory computer readable storage medium according to claim 14, where the program further comprises:

code for processing the colors of each of said tiles by:
  (a) merging each of the colors with noise to one of said colors without noise if the noise is halftone noise or texture noise; and
  (b) removing the colors with noise if the noise is bleeding noise; and code for quantising the pixels of the tile to those remaining dominant colors of said set, to thereby reduce noise in the image of the compound document.

\* \* \* \* \*